CORRELATION CURVES OF RESIDENCE TIME VERSUS TEMPERATURE FOR ALKYLATION FACTOR "A" DETERMINATIVE OF 2,3-DIMETHYL PENTANE: 2,4-DIMETHYL PENTANE RATIO FOR PROPYLENE-ISOBUTANE ALKYLATION IN THE PRESENCE OF HYDROFLUORIC ACID

Patented Feb. 25, 1947

2,416,395

UNITED STATES PATENT OFFICE 2,416,395

ALKYLATION PROCESS

Carl S. Kuhn, Jr., Dallas, Tex., assignor, by mesne assignments, to Socony-Vacuum Oil Company, Incorporated, New York, N. Y., a corporation of New York Application July 22, 1944, Serial No. 546,111

4 Claims. (Cl. 260—683.4)

This invention relates to catalytic alkylation of paraffin hydrocarbons with olefin hydrocarbons. The invention particularly relates to the manufacture of high grade motor fuels by the catalytic alkylation of normally gaseous isoparaffins with propylene, and is a continuation-in-part of my copending application Serial Number 320,097, filed February 21, 1940.

Catalytic synthesis of high grade motor fuels by means of alkylation of suitable paraffins with suitable olefins has assumed increasing importance in the recent years. By proper choice of paraffins and olefins, as for example, isobutane and a butylene, and by carrying out the process under proper conditions, the reaction can be controlled to give directly high yields of products composed of iso-octanes or paraffinic compounds approximating iso-octanes in structure and efficiency as motor fuel. The process is of particular importance since gaseous products containing suitable isoparaffins and olefins are common by-products in the petroleum art.

Various catalysts have been proposed for this alkylation reaction. Sulphuric acid, the use of which for catalytic alkylation is disclosed in U. S. Patent 2,169,809 to Jacque C. Morrell has proven commercially satisfactory. More recently, hydrofluoric acid has found widespread acceptance as an especially useful alkylation catalyst, and the use of this catalyst for alkylation is disclosed in U. S. Patent 2,267,730 to A. V. Grosse et al. and in my copending application above referred to. Hydrofluoric acid has many advantages for the alkylation of isoparaffins among which may be mentioned its low viscosity as compared with sulphuric acid, rendering agitation of the hydrocarbon-acid catalyst mixture more economical, and its nonoxidizing character as compared with sulphuric acid, enabling its use over a wider temperature range and with less undesirable side reactions. Additionally because of the low boiling point and thermal stability of the acid at normal and moderately elevated temperature levels, hydrofluoric acid may be readily purified for continued reuse in/an alkylation between process without decomposition. Furthermore, hydrogen fluoride is of a simple, stable composition and its preparation and use present no particular difficulties. It can be handled, for example, in ordinary steel or stainless steel equipment.

The alkylation reaction is generally conceived of as a direct union between a molecule of isoparaffin and a molecule of an olefin to yield a molecule of branched chain paraffin having a number of carbon atoms corresponding to the total number of carbon atoms in the original isoparaffin plus the number of carbon atoms in the olefin, thus

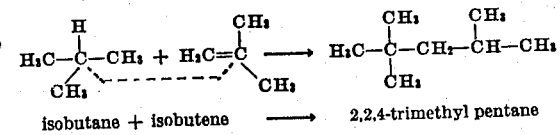

isobutane + isobutene ⟶ 2,2,4-trimethyl pentane

In the ordinary isobutane-butene alkylation, which has become a highly important commercial process for the production of aviation gasoline, it has been observed that a wide variety of hydrocarbons are found in the ultimate product, but these have been predominantly octanes and the explanation of the reaction as a direct reaction or union of isoparaffin with olefin has seemed sound. Since butene exists in three isomeric forms, i. e., butene-1, butene-2, and isobutene, a plurality of major product isomers was to be expected. Other octanes and heptanes and lighter or nonanes and heavier were explained as resulting from secondary reactions such as isomerization and reforming occurring within the original octane products. These explanations seemed to fit the facts in the case of butene alkylation.

The alkylation of other olefins such as propylene and pentene while possible with sulphuric acid and more practicable with hydrofluoric acid, as will be hereinafter pointed out more fully, were considered but never experimented with or studied in detail largely because it appeared that the hydrocarbon products were inferior to butenes alkylate.

If the considerations discussed above were sound as explaining the mechanics of what has been considered alkylation, then in the alkylation of isobutane with propylene, heptanes should be the major product with minor amounts of various hexanes and lighter, and octanes and heavier. I have found, however, that octanes may be fully as important products of propylene alkylation as heptanes, and that, for example, the octane 2,2,4-trimethyl pentane may constitute as much as about 40 mol percent of the entire alkylate product. Furthermore, it is difficult to ascribe this high octane formation to what are usually referred to as reforming or disproportionation reactions, i. e.,

since the amount of hexanes is nowhere near comparable.

Without intending to limit the invention to any theoretical considerations, I believe that a possible explanation of the formation of these octanes lies in the reactions expressed by the following equations:

(1) $C_3H_6 + iC_4H_{10} \rightarrow iC_4H_8 + C_3H_8$
(2) $iC_4H_8 + iC_4H_{10} \rightarrow iC_8H_{18}$
(3) $2iC_4H_8 \rightarrow iC_8H_{16}$
(4) $iC_4H_{10} + iC_8H_{16} \rightarrow iC_4H_8 + iC_8H_{18}$ The reactions involved are thus seen to be hydrogen-exchange reactions (Equations 1 and 4), accompanied by what has been commonly considered as alkylation (Equation 2) and/or polymerization (Equation 3). The occurrence of these phenomena in conventional butene-isobutane alkylation would not attract attention since the olefin and the isoparaffin have the same number of carbon atoms, and hence all primary products would have eight carbon atoms. And, since the butene feed stocks contain isomeric butenes, product variations are expected. If, however, as appears to be the case, alkylation is a much more complex reaction than has been heretofore supposed, then even in the simple case (from the standpoint of reaction mechanism) of propylene alkylation, a wide variety of products becomes possible even from primary reactions, and control of reaction conditions in alkylation reactions in order to obtain desired products is imperative. This is true since, as is well known, the octane rating, volatility, lead susceptibility, etc., of the various gasoline boiling hydrocarbons vary widely.

In order that my invention may be better understood and that certain terms used in the description thereof more clearly defined, the alkylation of propylene with isobutane will be described in conjunction with the flow sheet in Figure 1 of the drawings.

Referring to Figure 1, isobutane is introduced through line 1 provided with a suitable control valve 2 where it is admixed with recycle isobutane, obtained in the manner hereinafter described, returned through line 3, and propylene feed introduced through line 4 at a rate regulated by control valve 5 into alkylation reactor 6. Alkylation reactor 6 is diagrammatically illustrated as being of the reaction loop type wherein circulation is provided by pump 7 and temperature control is effected by diverting a suitable portion of the circulating reaction mixture through cooler 8 by flow regulating valve 9. Any suitable alkylation reactor and temperature control system could obviously be substituted for that diagrammatically illustrated. A portion of the reaction mixture is continuously withdrawn through line 20 at a rate regulated by control valve 21 and sent to separator 22 for gravity separation of hydrofluoric acid catalyst from the hydrocarbons of the alkylation reaction mixture emulsion. Recycle acid catalyst is withdrawn from the lower portion of separator 22 and returned through valved line 23 by pump 24 to the alkylation reactor. Make up hydrofluoric acid is introduced as necessary through valved line 25 to the hydrofluoric acid recycle line 23. The hydrocarbon phase from the separator is taken overhead through line 30 and sent to a hydrofluoric acid stripping column 31 where the major portion of dissolved and suspended hydrofluoric acid carried over in the hydrocarbon phase is vaporized overhead and returned to the alkylation reactor through line 32. The substantially hydrofluoric acid free bottoms from stripping column 31 are then pumped through line 33 to depropanizer 34. Residual traces of hydrofluoric acid and organic fluorides contained in the bottoms from stripper 31 may be removed by chemical treatment, as with bauxite, prior to introduction of the hydrocarbons into depropanizer 34, if desired. Propane formed in the reaction or introduced with the fresh hydrocarbon feed together with any unreacted propylene are removed overhead through line 35 for further treatment. The depropanized hydrocarbons are then pumped through line 40 to deisobutanizer 41 from which unreacted isobutane and any isopropyl fluoride formed are taken off overhead via line 42, condensed in condenser 43, and returned through line 3 to the alkylation reactor as hereinbefore described. The bottoms from deisobutanizer 41 which consist principally of the alkylate hydrocarbon product together with any normal butane introduced with the isobutane feed or formed in the reaction are then pumped to stabilizer 45 via line 46. The stabilized alkylate gasoline may be recovered from the bottom portion of stabilizer 45 and taken off through line 47.

Many modifications in the product fractionation and recovery system will be readily apparent to those skilled in the art, and the foregoing description thereof should be considered as illustrative only of an operative procedure.

The following terms as used hereinafter have the significance indicated below:

The "external isoparaffin-olefin ratio" refers to the mol ratio of fresh isobutane feed (in line 1) plus recycle isobutane (in line 3) to the fresh olefin feed (in line 4).

The "residence time" of the hydrocarbons is an arbitrary value representing theoretical average residence time of the hydrocarbons in contact with the catalyst and equals the total volume of hydrocarbons in the alkylation reactor including the cooler divided by the volume of total feed hydrocarbons per minute (the sum of the feed in lines 1, 3, and 4). This does not include the hydrocarbons in contact with catalyst in the line leading to the acid settler (line 20) nor in the settler itself; however, the relative amount in the former case is small, and in the latter case the additional contacting for the major part of the hydrocarbons is of short duration (of the order of a few seconds).

The "acid-hydrocarbon ratio" refers to the volume ratio of acid catalyst to total liquid hydrocarbons in the alkylation reactor.

As mentioned above I have found experimentally that a wide variety of reactions is involved in "alkylation," which includes besides the direct union of isoparaffin and olefin such reactions as hydrogen exchange, polymerization, isomerization and disproportionation. Since these reactions do not all proceed at the same rate and their respective rates are probably affected in different degrees by changes in temperature, I have realized the possibility of controlling the extent to which the various reactions occur in order that particularly desirable hydrocarbon products may be formed. Fundamentally, therefore, the object of my invention is to properly correlate the reaction conditions for the hydrofluoric acid alkylation of propylene so as to produce superior products containing relatively large amounts of high octane rating and otherwise desirable hydrocarbons. As used in the foregoing sentence and henceforth throughout this specification, unless otherwise indicated, by the term "alkylation" I refer broadly to the formation of predominantly saturated gasoline boiling hydrocarbons by a reaction, regardless of the reaction mechanism, involving the consumption of isoparaffin and olefin in approximately equimolar quantities, i. e., within 25 to 30%.

In order to more fully understand my invention reference should be made to Figures 2, 3 and 4, which represent a plot of product distribution versus temperature obtained in a series of experiments conducted at a constant average residence time of 135 minutes, a constant acid-hydrocarbon ratio of 0.20, and a constant external isobutane-propylene mol ratio of 5. The experiments in the series were conducted batchwise with a rate of addition of olefin of $6.82 \times 10^{-4}$ grams of olefin per gram of isobutane per minute.

Figure 1:
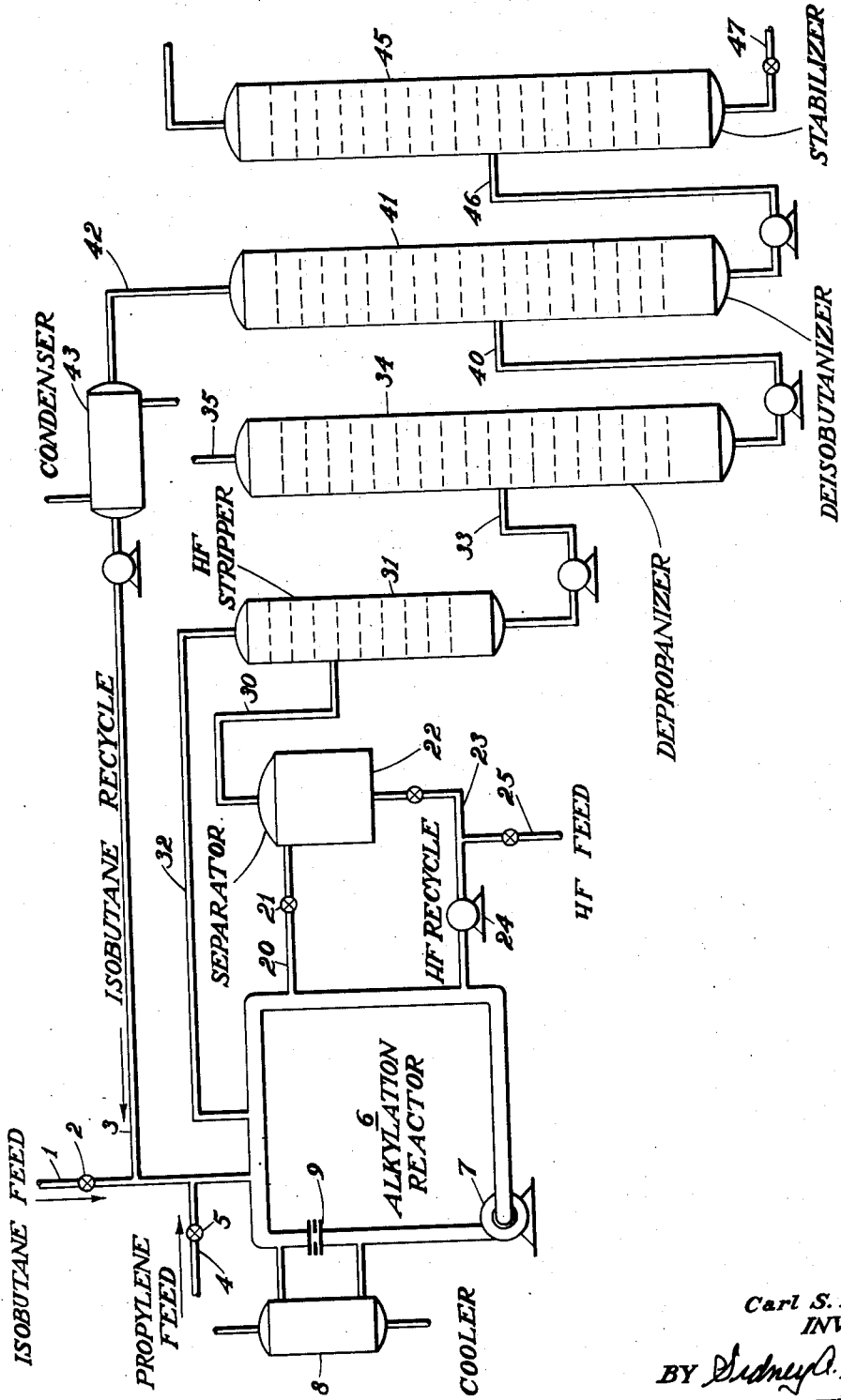
Figure 3:
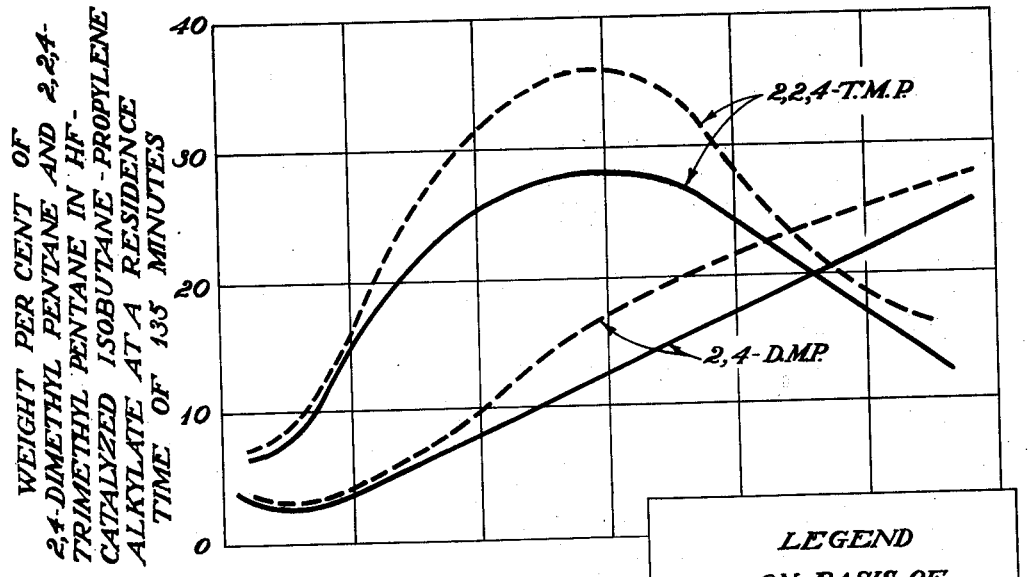
Figure 3 shows the variation in quantities of 2,4-dimethyl pentane and 2,2,4-trimethyl pentane with temperature on the basis of the $C_5$ to $C_8$ fraction and on the basis of total alkylate.
Figure 2:
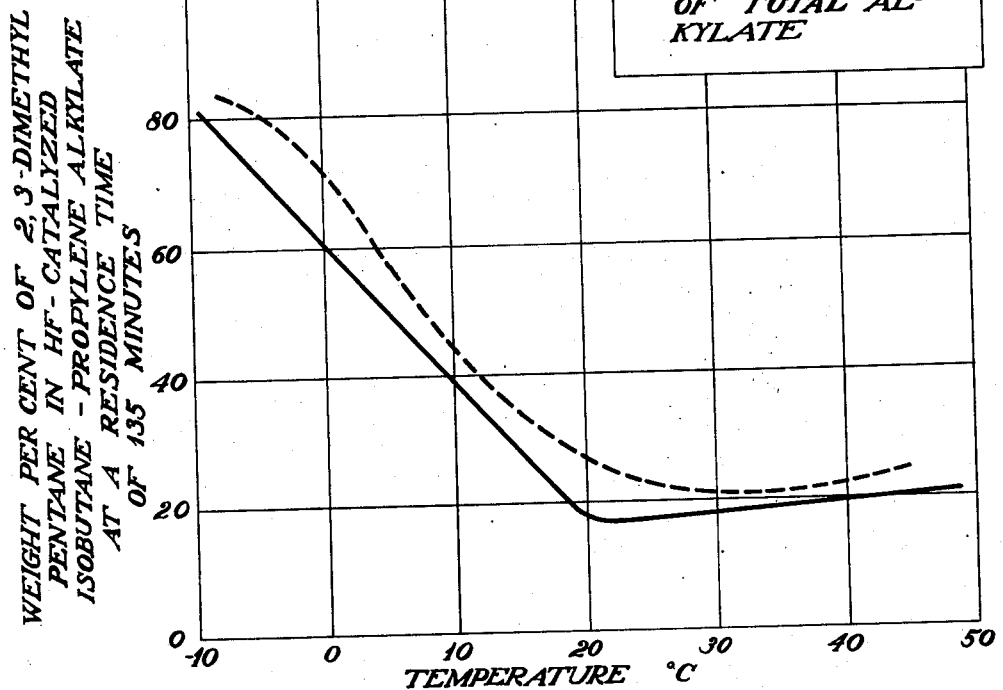
Figure 2 shows the variation in quantity of 2,3-dimethyl pentane with temperature under the reaction conditions outlined above on the basis of $C_5$ to $C_8$ fraction of the total alkylate, and on the basis of total alkylate.
Figure 4:
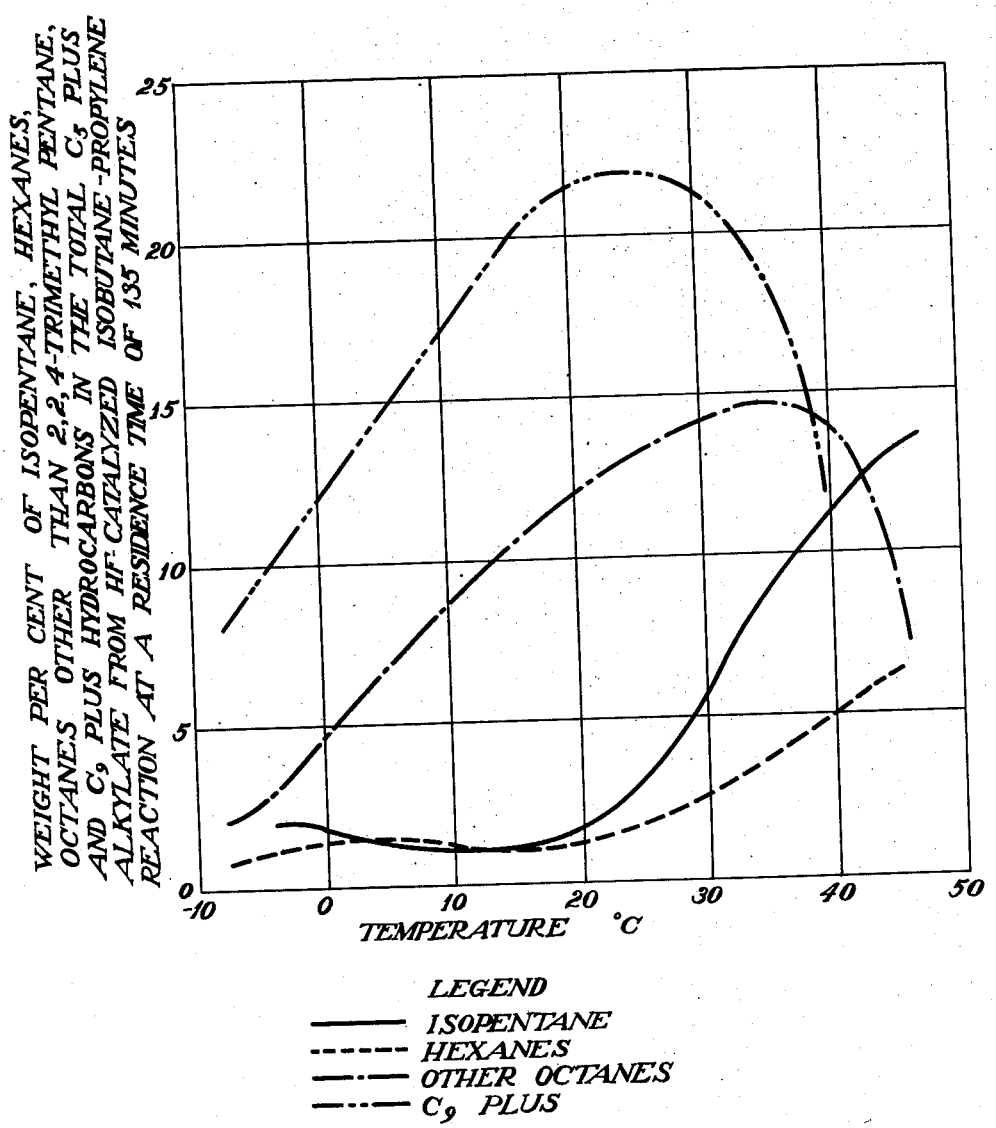
Figure 4 shows the variation in quantities of isopentane, hexanes, octanes other than 2,2,4-trimethyl pentane and $C_9$ plus hydrocarbons with temperature on the basis of total alkylate.

Although 2,2,4-trimethyl pentane is a highly desirable hydrocarbon, and, as may be seen from Figure 3, the process may be operated to produce over 30% (nearly 40% on the basis of the $C_5$ to $C_8$ fraction) of this hydrocarbon in the total alkylate product, I prefer to operate a propylene alkylation process utilizing the ratio of 2,3-dimethyl pentane to 2,4-dimethyl pentane as the factor controlling the selection of operating conditions. This is because 2,3-dimethyl pentane is a much more desirable hydrocarbon than 2,4-dimethyl pentane from the standpoint of a superior AFD 3-C, rich mixture rating. Therefore, even though high ratios of 2,3-dimethyl pentane to 2,4-dimethyl pentane do not generally correspond to a high yield of 2,2,4-trimethyl pentane, the elimination of the formation of a substantial quantity of a low performance constituent on a rich mixture basis is of primary importance.

Temperature, however, is not by any means the sole factor influencing the nature of the propylene alkylation reaction. Other variables also influence the reaction particularly residence time, and as the result of extensive experimentation I prefer to utilize what I shall hereinafter term an "alkylation factor" to correlate the variables in alkylation. In addition to temperature and residence time which are the main variables in determining the course of the reaction, other variables such as the acid-hydrocarbon ratio, degree of contacting or mixing of catalyst and hydrocarbons, olefin concentration in the reaction zone and external isobutane-propylene ratio affect the degree of alkylation and nature of the product. These other factors, however, exert but a relatively minor influence upon the composition of the $C_5$ to $C_8$ fraction so long as vigorous agitation is employed and the other variables lie within the ranges which are usual for commercial hydrofluoric acid alkylation.

As mentioned above, 2,3-dimethyl pentane is much preferred to 2,4-dimethyl pentane, and I therefore prefer to control the propylene alkylation to produce a minimum of the latter heptane. The reason for the undesirability of 2,4-dimethyl pentane will be readily apparent by a study of the octane ratings (A. S. T. M.) and performance numbers of these hydrocarbons.

|  | A. S. T. M. octane number (no lead) | A. F. D.—3C (rich)+4 cc. T. E. L. Perf. No. |
|---|---|---|
| 2,2,4-T. M. P | 100 | 154 |
| 2,4-D. M. P | 82 | 83 |
| 2,3-D. M. P | 89 | 143 |

Therefore in order to produce a high quality alkylate from propylene, conditions should be chosen such that the relative amount of 2,3-dimethyl pentane is of the order of about five times greater than the amount of 2,4-dimethyl pentane. Preferably the amount of 2,4-dimethyl pentane in the total alkylate is held to a value of not more than about 5 to 7%. While this may be readily done by conducting the reaction under conditions such that it is very incomplete, i. e., a low yield of alkylate on the basis of propylene consumed, it is obvious that the desired hydrocarbon distribution should be obtained at little or no sacrifice in yield. I have found that in order to obtain the desired product distribution with a yield of total alkylate of at least about 180% on the basis of weight of propylene converted (compared to the theoretical yield of 238%) the alkylation reaction should be controlled so that the value for the alkylation factor lies within the range of from 20.8 to 22.1 and preferably within the range 21.2 to 21.9, where the alkylation factor $$A = \frac{6500}{T} - \log_{10} \phi$$

where

T = Temperature in degrees Kelvin
$\phi$ = Residence time in minutes

At values for A of less than about 20.8 an excessive amount of 2,4-dimethyl pentane and propane are formed and the production of 2,3-dimethyl pentane drops to an undesirably low value. At values for A in excess of 22.1, the alkylation reaction is incomplete either because the residence time is too short, or the temperature is too low, or both. Within values for A as set forth above, 2,3-dimethyl pentane represents the major constituent of the total alkylate product, and within the preferred range this hydrocarbon represents more than about 90% of the heptane fraction while 2,4-dimethyl pentane is but a minor alkylation product.

Figure 5:
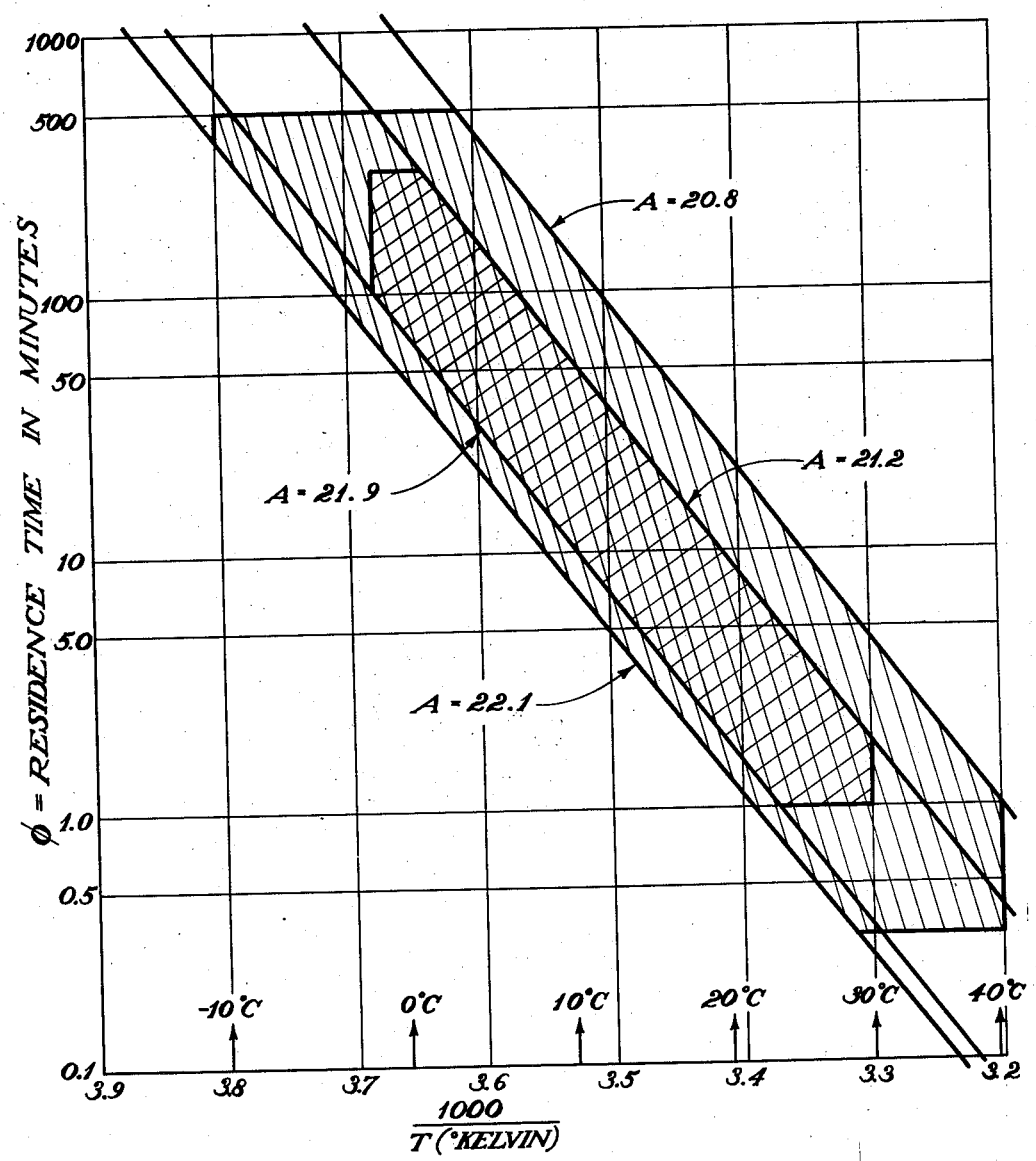

In order to illustrate the manner in which the residence time and the temperature of the reaction mixture should be correlated to attain the desired high 2,3-dimethyl pentane production and high yield of alkylate product on the basis of reactants consumed, and to avoid the undesirable production of propane, 2,4-dimethyl pentane and $C_9$ plus hydrocarbons, Figure 5, which represents a plot of residence time against reaction temperature, depicts in the shaded area the desirable operating range in accordance with my invention and in the cross hatched area the operating range preferably employed.

As mentioned previously, the permissible conditions are defined by the limits for A of between 20.8 to 22.1, with preferred values lying between 21.2 and 21.9. Other considerations and practicable operating conditions impose other limitations upon the alkylation conditions used. Temperatures below −10° C. should not be used, not only because of the extremely long residence time required to obtain the desired A value, but also because the formation of isopropyl fluoride by reaction between propylene and hydrogen fluoride becomes the principal reaction. For this reason, and because of the long residence time requirement, necessitating large reactor capacity for a given alkylate production, temperatures above 0° C. are preferably used. Residence times greater than 500 minutes are impracticable, and preferably residence times of less than 300 minutes are used.

Likewise temperatures of about 40° C. represent an upper limit. This is because of the fact that at the extremely low residence time permissible to meet the required A value, high rates of reaction impose impracticable requirements on reactor design and heat transfer equipment, and unless the temperature is held constant, the reactions are further accelerated and the A value falls below the permissible range. Temperatures below 30° C. should preferably be used. Within these temperature limitations, practical considerations of reactor design, and heat transfer requirements dictate a minimum residence time of about one-third of a minute and preferably of about one minute.

By a study of Figure 5, it will be readily apparent to those skilled in the art how to correlate the residence time and temperature to obtain a proper A value in order that a superior propylene-isobutane alkylate may be produced in high yield.

In order that the results obtained by operating a propylene-isobutane alkylation using hydrofluoric acid as the alkylation catalyst may be more fully understood, I have tabulated below the effect of temperature and residence times at various values for A upon the 2,3-dimethyl pentane content of the heptane fraction and upon the yield of total alkylate. The ratio of 2,3-dimethyl pentane to 2,4-dimethyl pentane may be very nearly determined from the values given since the amount of other heptanes is very small, of the order of from 1 to 2% of the total alkylate over the range of conditions of interest. The results tabulated represent a selection of typical examples and, where yield ranges are indicated, represent variations in results of several experiments obtained at the conditions indicated. Largely these variations are believed to be due to difficulties in maintaining temperature levels constant and olefin feed rates uniform in small scale batch and continuous operation, particularly at the shorter residence times.

| T degrees | | $\phi$ minutes | A | Per cent 2,3-D. M. P. in C$_7$ fraction | Per cent yield of total alkylate |
|---|---|---|---|---|---|
| K | C | | | | |
| 265 | −8 | 135 | 22.4 | 95.7 | 75–90 |
| 271 | −2 | 135 | 21.9 | 96.0 | 130–150 |
| 276 | 3 | 135 | 21.4 | 92.1 | 209 |
| 283 | 10 | 135 | 20.9 | 88.6 | 210–220 |
| 288 | 15 | 135 | 20.4 | 70.5 | 218–225 |
| 298 | 25 | 135 | 19.7 | 52.7 | 215–225 |
| 308 | 35 | 135 | 19.0 | 49.3 | 222 |
| 283 | 10 | 8 | 22.0 | 92.5 | 110–145 |
| 298 | 25 | 8 | 21.0 | 80.9 | 195–214 |
| 313 | 40 | 8 | 20.1 | 64.7 | 195–210 |
| 278 | 5 | 35 | 21.8 | 94.5 | 185–202 |
| 289 | 16 | 4.5 | 21.8 | 92.5 | 195–201 |
| 297 | 24 | 2.2 | 21.6 | 91.7 | 180–195 |
| 297 | 24 | 60 | 20.1 | 49.8 | 228 |

In order to illustrate the relationship between the value of the alkylation factor and the relative amounts of 2,3 and 2,4-dimethyl pentane, the analysis of the C$_5$ to C$_8$ fraction obtained in several experimental runs at a constant A value of 21.8 is given below, with the operating temperature and residence times used at the values indicated.

| | Ex. 1 | Ex. 2 | Ex. 3 |
|---|---|---|---|
| Temp., ° C. | −2 | 5.0 | 16.0 |
| Residence time in minutes | 140 | 35 | 4.5 |
| Product distribution, weight percent: | | | |
| Pentanes | 1.23 | 0.36 | 3.19 |
| Hexanes | 2.58 | 1.62 | 2.56 |
| 2,4-D. M. P. | 3.89 | 4.22 | 6.04 |
| 2,3-D. M. P. | 78.00 | 71.10 | 75.30 |
| 2,2,4-T. M. P. | 10.58 | 16.25 | 8.93 |
| Higher C$_8$ | 3.72 | 6.45 | 3.98 |
| Percent 2,3-D. M. P. in total 2,3+2,4-D. M. P. | 95.3 | 94.5 | 92.7 |

From the foregoing table it is apparent that at a constant A value the amount of 2,3-dimethyl pentane in the total dimethyl pentane fraction remains substantially uniform. Other heptanes than the dimethyl pentanes are included in the values given for these two hydrocarbons, since they are distributed therebetween and represent but very small and difficultly separable fractions.

In carrying out the experiments from which the data tabulated above were obtained, a continuous reaction system similar to that illustrated in the flow sheet is satisfactory except that the continuous fractionation system can be eliminated and a representative sample of the hydrocarbon effluent from the separator after suitable stripping and stabilizing can be analyzed for the representative hydrocarbon constituents. Operating in this manner the lack of continuous isobutane recycle may be compensated for by an increase in the amount of isobutane feed. Continuous alkylation gives most satisfactory results for the shorter residence times particularly, since an attempt to get short residence time in batch operation results in high and nonuniform olefin concentrations. For experimental work conducted at longer residence times, i. e., upwards of thirty minutes batchwise operation is satisfactory and permits the use of quantities of materials more readily handled. The method of conducting a batch experiment is illustrated by the following example.

785 parts by weight of liquid isobutane are mixed thoroughly with 300 parts by weight of essentially anhydrous hydrofluoric acid. To this agitated mixture, 114 parts by weight of propylene (95% propylene, 5% propane) are added continuously over a period of four hours. During the addition of olefin, the temperature is maintained at about −8° C. (A=22.1), and after completing the addition of olefin, agitation is discontinued and the two liquid phases separated. The hydrofluoric acid phase is then withdrawn as the bottom layer and the hydrocarbon phase is washed with water, dried and fractionated. The material boiling above 27° C. in the hydrocarbon phase is recovered.

Although the alkylation of isobutane with propylene has been discussed herein referring to the substantially pure hydrocarbons, it is to be understood that in practical commercial operations the use of these hydrocarbons contaminated with other hydrocarbons is contemplated. Ordinary streams of isobutane contaminated with normal butane and minor quantities of other hydrocarbons from any source may be used. Likewise the propylene feed stock employed need not be pure, and may be admixed with considerable proportions of propane for example. Other olefins may also be present in small amounts up to 5 or 10 mol percent or slightly higher on the basis of total olefins. The process conditions outlined herein, however, are not intended for application to olefin mixtures since the reaction variables herein controlled are controlled in accordance with the attainment of a desirable propylene alkylate and not other olefinic alkylates. Likewise the effect of large amounts of other hydrogen acceptors than propylene might well substantially alter the conditions herein found desirable.

The foregoing description of my invention is illustrative only of the mode of hydrofluoric acid-propylene alkylation, and the invention should not be construed as limited except as required by the appended claims.

I claim:

1. Process for the production of alkylate hydrocarbon fuel of high octane rating and consisting predominantly of 2,3-dimethyl pentane which comprises reacting propylene with isobutane in the substantial absence of other unsaturated hydrocarbons and under alkylating conditions of isobutane to propylene concentration ratio in the presence of hydrofluoric acid as the effective catalytic agent in a reaction zone, maintaining a temperature of from about $-10°$ C. to about $+40°$ C. in the reaction zone, correlating the residence time of the hydrocarbons in the reaction zone with the temperature to give a factor of alkylation in accordance with the formula $$A = \frac{6500}{T} - \log_{10} \phi$$

where $T=$Temperature in degrees Kelvin
$\phi=$Residence time in minutes
$A=$The alkylation factor and represents a value between 20.8 and 22.1.

2. Process for the production of alkylate hydrocarbon fuel of high octane rating and consisting predominantly of 2,3-dimethyl pentane which comprises reacting propylene with isobutane in the substantial absence of other unsaturated hydrocarbons and under alkylating conditions of isobutane to propylene concentration ratio in the presence of hydrofluoric acid as the effective catalytic agent in a reaction zone, maintaining a temperature of from about 0° C. to about 30° C. in the reaction zone, correlating the residence time of the hydrocarbons in the reaction zone with the temperature to give a factor of alkylation in accordance with the formula $$A = \frac{6500}{T} - \log_{10} \phi$$

where $T=$Temperature in degrees Kelvin
$\phi=$Residence time in minutes
$A=$The alkylation factor and represents a value between 21.2 and 21.9.

3. Process for the production of alkylate hydrocarbon fuel of high octane rating and consisting predominantly of 2,3-dimethyl pentane which comprises reacting propylene with isobutane in the substantial absence of other unsaturated hydrocarbons and under alkylating conditions of isobutane to propylene concentration ratio in the presence of hydrofluoric acid as the effective catalytic agent in a reaction zone, maintaining the hydrocarbons and acid catalyst in contact in said reaction zone for a residence time of from 0.33 to 500 minutes, maintaining a temperature of from about $-10°$ C. to about $+40°$ C. in the reaction zone, correlating the residence time of the hydrocarbons in the reaction zone with the temperature to give a factor of alkylation in accordance with the formula $$A = \frac{6500}{T} - \log_{10} \phi$$

where $T=$Temperature in degrees Kelvin
$\phi=$Residence time in minutes
$A=$The alkylation factor and represents a value between 20.8 and 22.1.

4. Process for the production of alkylate hydrocarbon fuel of high octane rating and consisting predominantly of 2,3-dimethyl pentane which comprises reacting propylene with isobutane in the substantial absence of unsaturated hydrocarbons and under alkylating conditions of isobutane to propylene concentration ratio in the presence of hydrofluoric acid as the effective catalytic agent in a reaction zone, maintaining the hydrocarbons and acid catalyst in contact in said reaction zone for a residence time of from 1.0 to 300 minutes, maintaining a temperature of from about 0° C. to about 30° C. in the reaction zone, correlating the residence time of the hydrocarbons in the reaction zone with the temperature to give a factor of alkylation in accordance with the formula $$A = \frac{6500}{T} - \log_{10} \phi$$

where $T=$Temperature in degrees Kelvin
$\phi=$Residence time in minutes
$A=$The alkylation factor and represents a value between 21.2 and 21.9.

CARL S. KUHN, Jr.

REFERENCES CITED

The following references are of record in the file of this patent:

UNITED STATES PATENTS

| Number | Name | Date |
|---|---|---|
| 2,267,730 | Grosse et al. | Dec. 30, 1941 |
| 2,322,800 | Frey | June 29, 1943 |